United States Patent [19]

Sherby

[11] Patent Number: 4,699,169

[45] Date of Patent: Oct. 13, 1987

[54] INLET VALVE MECHANISM FOR A TOILET TANK

[75] Inventor: Marc Sherby, Chester County, Pa.

[73] Assignee: Plumbmaster, Inc, Irving, Tex.

[21] Appl. No.: 876,110

[22] Filed: Jun. 19, 1986

[51] Int. Cl.[4] .................... F16K 31/26; F16K 33/00
[52] U.S. Cl. ............................... 137/434; 137/437; 137/444
[58] Field of Search ............... 137/426, 434, 435, 436, 137/437, 443, 444, 442, 441

[56] References Cited

U.S. PATENT DOCUMENTS

| | | | |
|---|---|---|---|
| 505,272 | 9/1893 | Kelly | 137/437 |
| 1,323,960 | 12/1919 | Burrill | 137/444 |
| 1,497,796 | 6/1924 | Sherwood | 137/444 |
| 1,629,914 | 5/1927 | Haas | 137/437 |
| 2,155,698 | 4/1939 | Zinkil | 137/436 |
| 2,271,419 | 1/1942 | Egan | 137/437 |
| 2,667,179 | 1/1954 | Bennett | 137/437 |
| 2,791,235 | 5/1957 | Smith | 137/444 |
| 3,242,940 | 3/1966 | Sirotek | 137/437 |
| 3,495,618 | 2/1970 | Iles | 137/437 |
| 3,853,141 | 12/1974 | Fischer | 137/436 |

*Primary Examiner*—George L. Walton
*Attorney, Agent, or Firm*—Stuart E. Beck

[57] ABSTRACT

An inlet valve mechanism for a toilet tank comprising a housing, a tapered valve seat and a tapered valve body. The valve seat and valve body are engagable with each other by the valve body moving reciprocally relative to the valve seat as the toilet tank is filled and emptied. The valve seat and valve body are made of a ceramic material.

9 Claims, 5 Drawing Figures

INLET VALVE MECHANISM FOR A TOILET TANK

BACKGROUND OF THE INVENTION

1. Field of the Invention

This invention relates to an inlet valve mechanism and more particularly to a inlet valve mechanism for a toilet tank.

It would be desirable to have an inlet valve for a toilet tank which can be manufactured with a minimum number of parts and will operate with a high degree of reliability and with a minimum amount of maintenance.

Additionally, it would be desirable to manufacture such a valve in such a way that the often noisy filling of the toilet tank can be eliminated so that quiet operation of the filling mechanism can be enhanced.

Further, it would be additionally advantageous if the mechanism were substantially the same size as conventional filling mechanisms so that they could be placed in a standard toilet tank.

2. Summary of the Invention

Briefly, the invention relates to an inlet valve mechanism for a toilet tank which comprises a housing, a valve seat and a valve body which is supported in the housing for reciprocal movement into and out of engagement with the valve seat.

BRIEF DESCRIPTION OF THE DRAWING

The invention will be better understood, and further advantages and uses thereof are readily apparent when considered in view of the following detailed description of an exemplary embodiment, taken with the accompanying drawing in which.

DESCRIPTION OF THE PREFERRED EMBODIMENT

Figure 1:
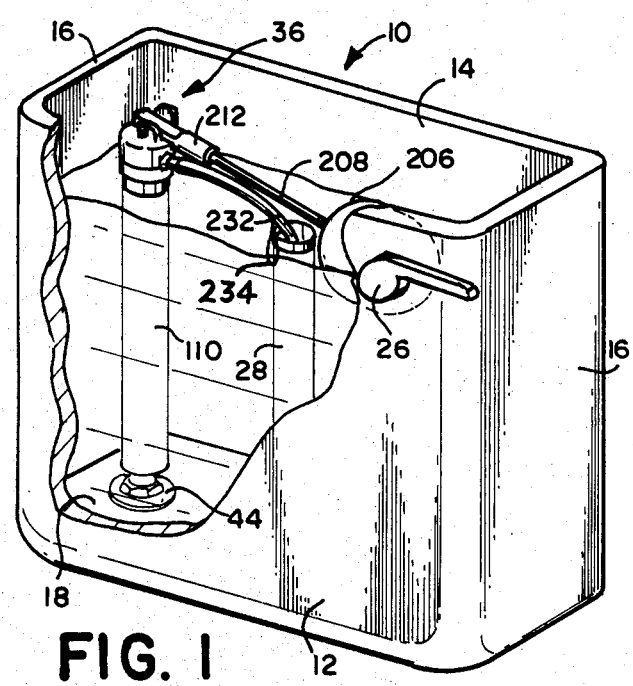
FIG. 1 is a perspective view of a toilet tank with a portion thereof cut away to show a device comprising the invention.

Referring to FIG. 1, a toilet tank 10 of the type used typically in lavatories, bathrooms and the like which may be made from a suitable ceramic material as is well-known in the art comprises a front wall 12 which is shown partially broken away, a rear wall 14, side walls 16 and a bottom wall 18.

As seen in FIG. 1 the front wall includes a flush lever 26 which is connected in a well-known manner to the tank outlet valve (not shown) and a conduit 28 which is connected through the bottom wall 18 of the toilet tank to the toilet bowl.

Figure 2:
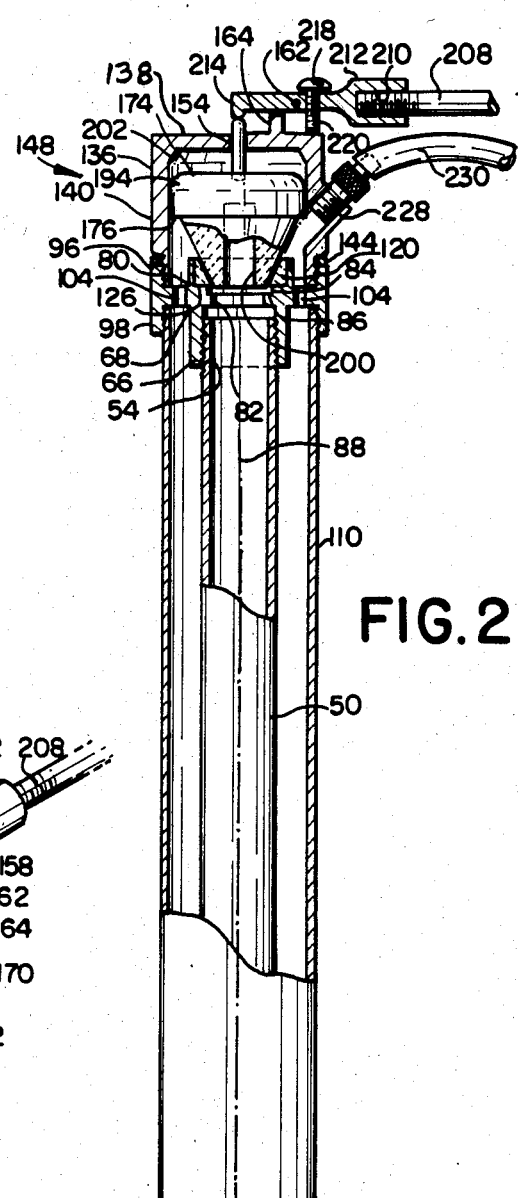
FIG. 2 is a side elevation view partially in section of a device comprising the invention.

The inlet valve mechanism comprising the invention 36 is connected to the bottom wall 18 of the housing as best seen in FIG. 2. Thus, the bottom wall 18 of the toilet tank 10 has an opening 40. A section of threaded shank 42 which may be connected to a suitable water supply is centrally positioned in the opening 40 by flanged nuts 44 and 46. One of the flanged nuts 44 may be provided with a suitable tapered seal 48 to minimize the likelihood of leakage through opening 40.

A first elongated liquid conduit 50 is threaded at its lower end 52 so that it can be connected to the flanged nut 44 thereby providing an inlet conduit for the valve mechanism.

Figure 5:
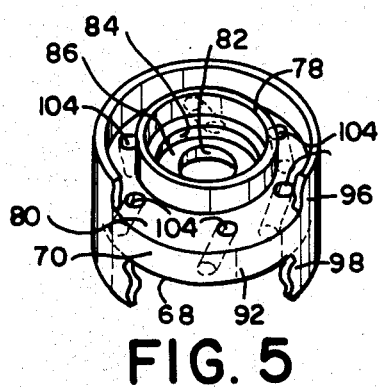
FIG. 5 is a perspective view of a detail of the device shown in FIG. 2.

At its upper end 54 the first conduit 50 is threadingly connected to a first depending annular wall 66 which is threaded on its interior surface. The first depending annular wall 66 depends from the bottom surface 68 of a disk 70 (FIG. 5).

A first raised annular wall 78 extends upwardly from the top surface 80 of disk 70. An aperture 82 is disposed in the center of disk 70. The upper end of aperture 82 may have an enlarged diameter 84 so that a filtering screen (not shown) can be received on the ledge 86 between the two diameters 82 and 84.

First depending annular wall 66, first raised annular wall 78 and aperture 82 are coaxial and lie along the longitudinal axis 88 of first conduit 50.

Supported on the circumference 92 of disk 70 is an annular collar 94 which comprises an upper internally threaded portion 96 and a lower internally threaded portion 98.

A plurality of liquid passages 104 extend between the bottom and top surfaces 68 and 80 of disk 70. The passages 104 are angularly disposed relative to longitudinal axis 88 so that they tend to direct the liquid flow downwardly and outwardly as will be more completely explained herein.

A second elongated conduit 110 is threaded at its upper end so that it can be threadingly connected to the lower threaded portion 98 of annular collar 94. The second conduit 110 is somewhat shorter than first conduit 50 so that its lower end defines an opening 114 through which liquid can be discharged into the tank.

A valve seat 120 is disposed in the recess defined by the top surface 80 of disk 70 and the first raised annular wall 78. The valve seat may be made of a suitable ceramic material such as those which include alumina oxide or a glass silicate. Alternatively, any ceramic which is not susceptible to erosion and the accumulation of mineral deposits can be used.

Figure 3:
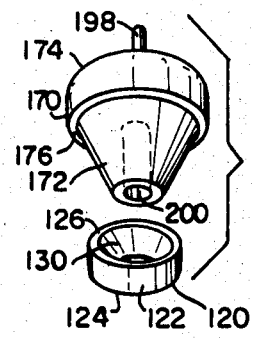
FIG. 3 is a detail exploded perspective view of a portion of the device shown in FIG. 2.

As best seen in FIGS. 2 and 3 the valve seat has an outer annular wall 122 which can be telescopically and slidingly received within first raised annular wall 78. Its lower surface 124 is flat so that it can be fastened by a suitable adhesive to the portion of top surface 80 disposed within the raised annular wall 78. In this position it retains the filtering screen in place on ledge 86. The valve seat includes an upper surface 126.

A tapered aperture 130 extends between upper and lower surfaces 124 and 126. The side walls of the aperture are preferably disposed at an angle of about twenty-five degrees relative to longitudinal axis 88. Although, the angle defined by the side walls of the aperture is not critical better liquid flow characteristics are achieved when the side wall angle is between about twenty to thirty degrees relative to axis 88.

Thus, the opening defined by the aperture in upper surface 126 has a diameter which is larger than the opening defined by the aperture 130 in lower surface 124.

A generally cup-shaped member 136 comprising an upper generally circular wall 138 and a depending generally cylindrical side wall 140 is threadingly connected to the upper threaded portion 96 of annular collar 94. A suitable sealing member such as ring seal 144 can be disposed between side wall 140 and upper threaded portion 96 to prevent leakage.

Thus, from what has been described earlier, it is apparent that disk 70 and annular collar 94 define the lower portion of a housing 148 and the aforementioned cup-shaped member 136 defines the upper portion of that housing.

Figure 4:
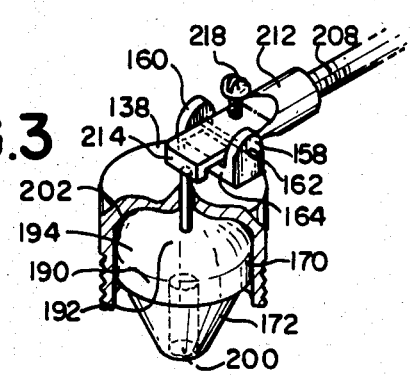
FIG. 4 is a perspective view partially in section of a portion of the device shown in FIG. 2.

The upper wall 138 of housing 148 includes an axially positioned opening 154. Suitable means for defining a pivotal connection are provided on top wall 138 between the aforementioned opening 154 and side wall 140. As best seen in FIGS. 2 and 4 the means comprise ears 158 and 160 which are arranged in spaced lateral relation and extend upwardly from the top wall 138. Each of the ears is provided with an aperture through which a pivot pin 162 can extend.

A suitable stop such the upwardly extending wall 164 is supported on top wall 138 intermediate ears 158 and 160.

A valve body 170 which may be made from the same ceramic material as the valve seat is disposed in housing 148 for reciprocating movement along axis 88 into and out of engagement with valve seat 120 and upper wall 138. Valve body 170 comprises a lower portion 172 which has the same taper as the taper of the aperture 130 in the valve seat so that it can nest therein when the valve is closed as seen in FIG. 2. The use of a ceramic for the valve seat and body are especially advantageous since minerals, organic materials or other chemicals which are in the liquid entering the toilet tank will not accumulate as fast as on metal or synthetic rubber valve parts, nor will the ceramic valve parts erode. The valve body also includes an upper portion 174. The upper portion is somewhat larger in diameter than the largest part of the lower portion so that a downwardly facing ledge 176 is defined. It is generally cylindrical in shape and is just slightly smaller in diameter than the diameter across the inner surface of side wall 140 of housing 148. Thus, the upper portion 174 of valve body 170 serves to guide the valve and keep it from cocking as it reciprocates within the housing.

The upper portion 174 of valve body 170 includes a generally cylindrical side wall 190 and a circular top wall 192. The juncture of the side wall 190 and top wall 192 is tapered at 194. Similarly, the juncture 202 of the housing side wall 140 and housing top wall 138 is tapered to the same extent as taper 194.

A pin 198 which is secured at one end in valve body 170 extends upwardly through the opening 154 in the top wall 138.

The lower portion 172 and intermediate portion 174 of the valve body include a downwardly facing recess 200.

Referring to FIGS. 1, 2 and 4, the means by which the valve body 170 is permitted to reciprocate in housing 148 is illustrated. In FIG. 1, a hollow ball 206 of a type which is well-known in the art is connected by a rod 208 to the internally threaded recess 210 of an arm 212. The arm 212 is provided with a horizontally disposed opening (not shown) through which pivot pin 162 extends. This constrains the arm 212 for pivoting reciprocating movement about the pivot pin 162. A downwardly depending finger 214 at the distal end of arm 212 has an elliptical surface for engagement with pin 198.

A stop member in the form of set screw 218 is threadingly received in an opening 220 in arm 212 intermediate pivot pin 162 and side wall 140. The end of the set screw 218 bears against the upper wall 138.

Suitable means is provided for connecting the interior of housing 148 to conduit 28. Thus, an internally threaded aperture 228 is provided in side wall 140. An elongated flexible conduit 230 has one end threadingly received in the aforementioned aperture 228. Its other end 232 can be disposed in conduit 28 and held therein by a suitable spring clip 234.

The above described inlet valve mechanism may be used in a conventional toilet tank. Thus, it can be readily connected to the tank and to the water supply by securing conduit 50 to the bottom 18 of the tank 10. Referring to FIGS. 1 and 2, the valve mechanism is shown in the configuration that it takes when the tank 10 is filled with liquid and the valve is closed. Thus, the ball 206 has caused the rod 208 and arm 212 to pivot counter clockwise. This has urged the finger 214 into engagement with pin 198. The downward pressure on pin 198 causes the ceramic valve body to move downwardly inside the housing 148 so that its tapered side wall comes into sealing contact with the side wall of the tapered opening 130 in the ceramic valve seat. The valve body is prevented from crushing the valve seat since wall 164 limits the downward movement of arm 212.

When the toilet is flushed and the water drains from the tank, the ball 206 falls and the rod 208 and arm 212 pivot clockwise to separate finger 214 from pin 198. The water which enters the first conduit 50 from the fluid supply bears against the lower portion 172 of the valve body and the ledge 176 to move the valve body up inside the housing. To a substantial extent this movement is assisted by recess 200. Thus, the recess has the dual salutory effect of first, reducing the weight of the valve body relative to its size to reduce the force necessary to raise it and second, to enhance the buoyancy of the valve body because of the air trapped in it.

Liquid then flows up through conduit 50 and through apertures 82 and 84 and the filtering screen and into housing 148. The upward movement of the valve body 170 is limited by its upper portion 176 engaging the top wall 138 of the valve housing. Its tapered surface 194 moves into engagement with the tapered juncture 202 of the top and side walls 138 and 140 of the housing 148 to prevent leakage of liquid through opening 154 in the top wall. Consequently, all of the liquid which enters the valve housing exits either through aperture 228 and conduit 230 into the toilet bowl or exits by way of angularly disposed passages 104. The angularly disposed passages 104 create the liquid streams that strike against and cascade down the inner surface of the second conduit 110. This substantially diminishes the noise made by the liquid as it fills the tank. The liquid is discharged from the second conduit 110 into the tank at opening 114 at its lower end.

As the toilet tank fills with liquid, the ball 206 rises thereby forcing finger 214 to press on pin 198 and lower the valve body 170 into engagement with the valve seat 120 to close the valve. Since the mating surfaces of the valve body and valve seat are tapered to the same angle relative to the direction of liquid flow, the valve body and valve seat come together to cut off the liquid flow in a smooth and quiet manner.

Thus, while the invention has been described with respect to a particular apparatus, it is apparent that other forms of the inventive apparatus can be employed to achieve the intended result. Thus, the scope of the invention should not be limited by the foregoing description, but, rather only by the scope of the claims appended hereto.

I claim:

1. An inlet valve mechanism for a toilet tank comprising a housing, said housing including upper and lower walls and a side wall, said lower wall comprising a disk, said disk including a circumference, an axially located aperture, a top surface and a bottom surface, an annular collar, the circumference of said disk being connected to an intermediate portion of said annular collar to define upper and lower portions of said annular collar, said side wall being connected to said upper portion of said annular collar, a first raised annular wall supported on said top surface in radially outwardly spaced relation to said aperture, said raised annular wall and the portion of said top surface bounded thereby defining a recess, a valve seat, said valve seat including a central opening and being supported by said lower wall within said recess with said central opening lying along said axis and being in alignment with said aperture, said valve seat comprising an annulus with a tapered inner wall that defines said central opening, a valve body, said valve body being supported in said housing for reciprocal movement along said axis between a first position where a portion of it engages and closes said central opening and a second position where it disengages and opens said central opening, said portion of said valve body being tapered, and the taper of said inner wall and the taper of said portion of said valve body are substantially the same so that they can come into close fitting engagement to close said central opening.

2. A mechanism as defined in claim 1 including an opening in said upper wall, a portion of said valve body extending through said opening in said upper wall, first means connected to said housing for movement in response to the liquid level in said toilet tank, said first means being engagable with said portion of said valve that extends through said upper wall to urge said valve body into engagement with said valve seat when the liquid level in said toilet tank rises, the juncture of said upper wall and said side wall of said housing is tapered, the upper portion of said valve body is tapered, and the taper of said juncture is substantially the same as the taper of said upper portion so that said tapered upper portion of said valve body is sealingly received by said tapered juncture when said valve body is in said second position to close said opening in said upper wall.

3. A mechanism as defined in claim 2 wherein said first means comprises a float and a lever, means for connecting said float to one end of said lever, and means connected to said housing for pivotally supporting said lever, and the other end of said lever is in engagement with said portion of said valve body that extends through said upper wall, and means for limiting the movement of said first means as the liquid level in said toilet tank rises to prevent said valve body from crushing said valve seat.

4. A mechanism as defined in claim 2 including, an aperture in said side wall of said housing, and an elongated conduit having one end connected to said side wall at said aperture therein.

5. A mechanism as defined in claim 1;

including a recess in said valve body, said recess being in alignment with said axis and facing said valve seat.

6. A mechanism as defined in claim 1 including, first and second conduits, said conduits being connected to said lower wall, said first and second conduits lying along said axis with said first conduit being disposed within said second conduit and in spaced relation thereto, and a plurality of circumferentially spaced passages in said lower wall, said passages being disposed between said first and second conduits and being disposed at an angle relative to said axis so that they direct a liquid flow against said second conduit.

7. A mechanism as defined in claim 6 including, a toilet tank, said tank having a bottom wall with an opening therein, said first conduit extending through said opening in said bottom wall, means for sealingly retaining said first conduit in said opening in said bottom wall and, the other end of said second conduit having an opening to permit fluid to flow therefrom.

8. A mechanism as defined in claim 1 wherein said valve seat and said valve body are comprised of a ceramic material.

9. A mechanism as defined in claim 1 including first and second conduits, one end of said first conduit being connected to said first depending annular wall, and one end of said second conduit being connected to the lower portion of said annular collar.

* * * * *